(12) United States Patent
Howard et al.

(10) Patent No.: US 6,833,685 B2
(45) Date of Patent: Dec. 21, 2004

(54) BATTERY CHARGER WITH STANDBY MODE

(75) Inventors: Geoffrey S. Howard, Columbia, MD (US); Edward A. Harrison, Bel Air, MD (US); Nathan J. Cruise, Parkville, MD (US); Christopher R. Held, Glen Rock, PA (US); Robert A. Usselman, Forest Hill, MD (US); Thomas J. Garland, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 19 days.

(21) Appl. No.: 10/342,729

(22) Filed: Jan. 14, 2003

(65) Prior Publication Data

US 2003/0155889 A1 Aug. 21, 2003

Related U.S. Application Data

(60) Provisional application No. 60/357,921, filed on Feb. 19, 2002.

(51) Int. Cl.⁷ .................................................. H02J 7/00
(52) U.S. Cl. ....................................................... 320/128
(58) Field of Search ................................. 320/106, 114, 320/115, 127, 128, 138

(56) References Cited

U.S. PATENT DOCUMENTS

| 4,672,228 | A | * | 6/1987 | Swoboda | 307/66 |
| 5,952,814 | A | * | 9/1999 | Van Lerberghe | 320/108 |
| 6,356,054 | B1 | * | 3/2002 | Herrmann | 320/115 |

* cited by examiner

Primary Examiner—Edward H. Tso
(74) Attorney, Agent, or Firm—Adan Ayala

(57) ABSTRACT

A charger for charging a battery power source removably disposed on and connectable to the charger, the charger including a controller electrically connectable to a battery power source, at least one terminal connected to at least one of the controller and the battery power source, a power supply connectable to an outside power source, the power supply providing power to at least one of the controller and the battery power source, and a switch connected between the outside power supply and the power supply, the switch being activated when a battery pack is connected to the at least one terminal.

19 Claims, 5 Drawing Sheets

BATTERY CHARGER WITH STANDBY MODE

CROSS-REFERENCE TO RELATED APPLICATION

The present application derives priority under 35 USC §119(e) from U.S. Provisional Application No. 60/357,921, filed Feb. 19, 2002.

FIELD OF THE INVENTION

This invention relates generally to battery chargers and more particularly to battery chargers with standby mode.

BACKGROUND OF THE INVENTION

The battery packs for portable power tools, outdoor tools and certain kitchen and domestic appliances may include rechargeable batteries, such as lithium, nickel cadmium, nickel metal hydride and lead-acid batteries, so that they can be recharged rather than be replaced. Thereby a substantial cost saving is achieved.

A typical battery pack and charger are shown in FIG. 1. In such figure, a battery pack 10 is connected to a charger 20. Battery pack 10 may comprise a plurality of battery cells 11 connected in series and/or parallel, which dictate the voltage and storage capacity for battery pack 10. Battery pack 10 may include three battery contacts: first battery contact 12, second battery contact 13, and third battery contact 14. Battery contact 12 is the B+ (positive) terminal for battery pack 10. Battery contact 14 is the B− or negative/common terminal. Battery contact 13 is the S or sensing terminal. Battery contacts 12 and 14 receive the charging current sent from the charger 20 (preferably from current source 22, as discussed below) for charging the battery pack 10.

As shown in FIG. 1, the battery cells 11 are connected between the battery contacts 12 and 14. In addition, preferably connected between battery contacts 13 and 14 is a temperature sensing device 15, such as a negative temperature co-efficient (NTC) resistor, or thermistor, RT. The temperature sensing device is preferably in closer proximity to the cells 11 for monitoring of the battery temperature. Persons skilled in the art will recognize that other components, such as capacitors, etc., or circuits can be used to provide a signal representative of the battery temperature.

Battery pack 10 may also comprise an identifier as known in the prior art, so that charger 20 can identify the type and capacity of the battery pack, and charge accordingly.

The charger 20 preferably comprises a controller 21, which in turn includes positive terminal (B+) 16 and negative (B−) terminal 17, which are coupled to battery pack 10 via battery contacts 12 and 14, respectively. The positive terminal may also act as an input, preferably an analog/digital input, in order for the controller 21 to detect the battery pack voltage. In addition, the controller 21 may include another input TC, preferably an analog/digital input, which is coupled to the temperature sensing device 15 via the third battery contact 13 (S). This allows the controller 21 to monitor the battery temperature. Controller 21 may include a microprocessor 23 for controlling the charging and monitoring operations. Controller 21 may control a charging power source for providing power to the battery pack 10, such as current source 22 that provides current to battery pack 10. This current may be a fast charging current and/or an equalization current. Current source 22 may be integrated within controller 21.

The charger 20, and its elements within, including controller 21, microprocessor 23, and current source 22, receive the necessary power from a power supply 24, which may be connected to a vehicle battery, a generator, or an AC outlet. Power supply 24 may convert the power received from the vehicle battery, the generator, or the AC outlet to the necessary power requirements of the different elements, as is well known in the art.

When the battery pack 10 is not connected to the charger 20, the typical charger 20 consumes energy, as full power is still provided to the elements the charger 20.

SUMMARY OF THE INVENTION

In accordance with the present invention, an improved battery pack charger is employed. The charger includes a controller, a battery power source connected to the controller, at least one terminal connected to at least one of the controller and the battery power source, a power supply connectable to an outside power source, the power supply providing power to at least one of the controller and the battery power source, and a switch connected between the outside power supply and the power supply, the switch being activated when a battery pack is connected to the at least one terminal.

The charger includes a controller, a battery power source connected to the controller, at least one terminal connected to at least one of the controller and the battery power source, a power supply connectable to an outside power source, the power supply providing power to at least one of the controller and the battery power source, and a switch connected between the power supply and at least one of the controller and the battery power source, the switch being activated when a battery pack is connected to the at least one terminal.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 2 illustrates a charger according to a first embodiment of the present invention, where

FIG. 5 are circuit diagrams of a battery pack and a charger according to a fourth embodiment of the present invention, where

DETAILED DESCRIPTION

The invention is now described with reference to the accompanying figures, wherein like numerals designate like parts.

Figure 1:
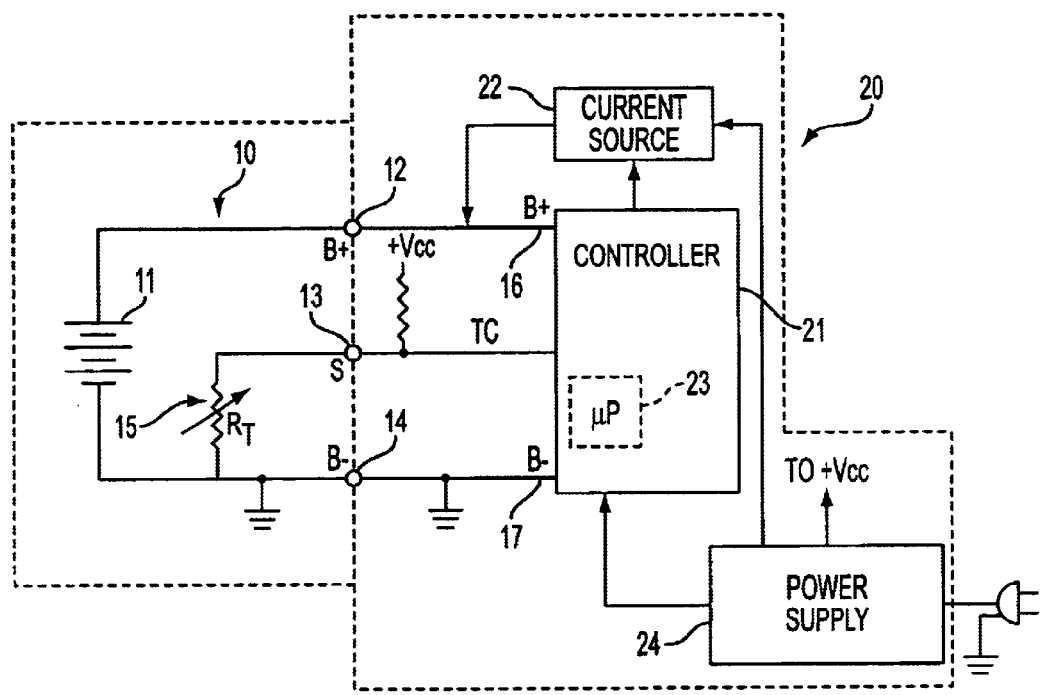
FIG. 1 is a circuit diagram of a prior art battery pack and charger.
Figure 2A:
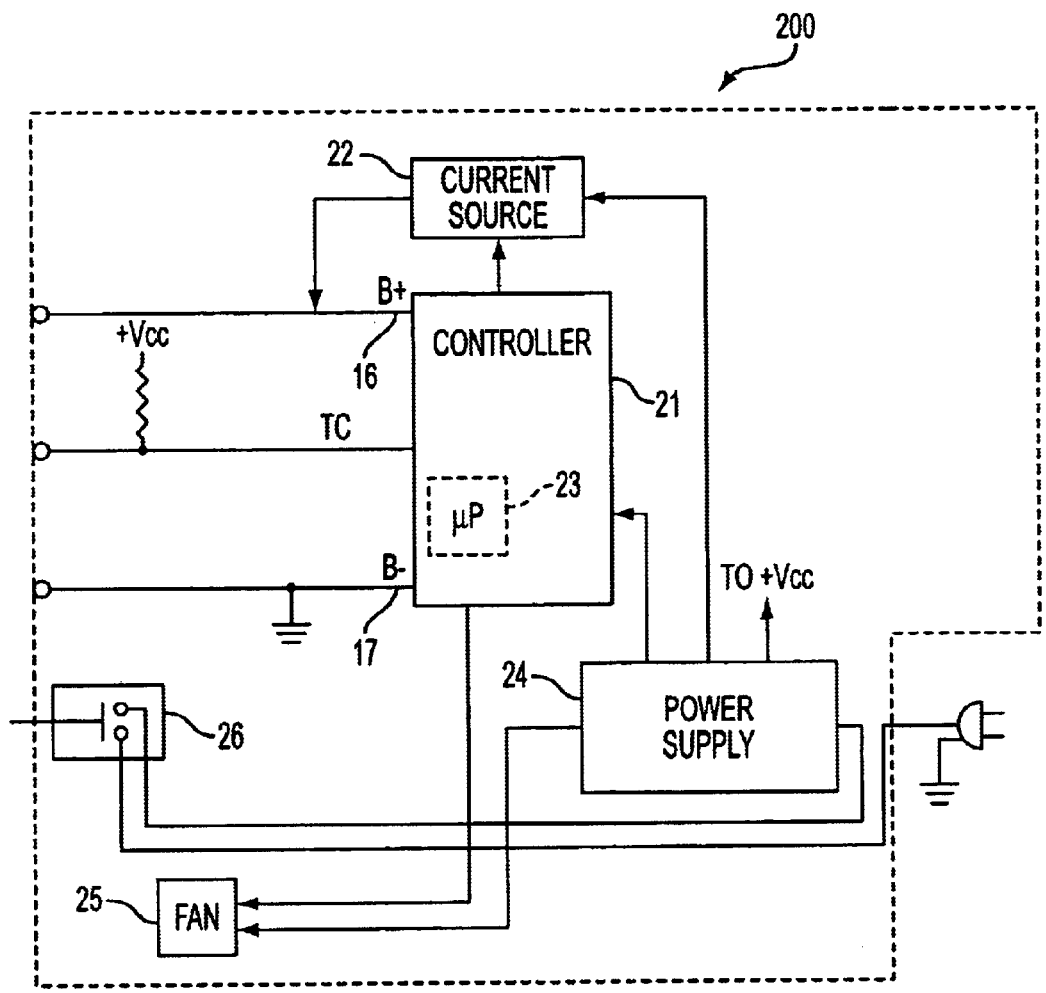
FIG. 2A is a circuit diagram of the charger and FIG. 2B is a side view of the battery pack and charger.
Figure 2B:
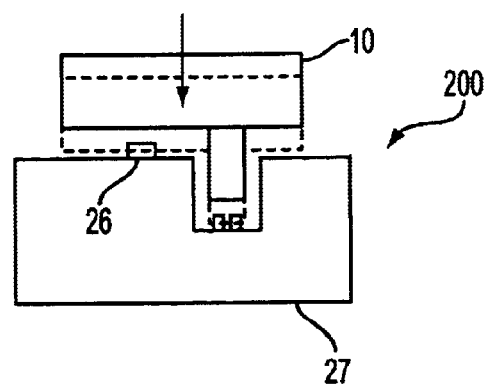

FIG. 2 illustrates a first embodiment of the invention, where a battery charger 200 preferably comprises a controller 21, which in turn includes positive terminal (B+) 16 and negative (B−) terminal 17, which are ultimately coupled to battery pack 10 via battery contacts 12 and 14, respectively. The positive terminal may also act as an input, preferably an analog/digital input, in order for the controller 21 to detect the battery pack voltage. In addition, the controller 21 may include another input TC, preferably an analog/digital input, which is coupled to the temperature sensing device 15 via the third battery contact 13 (S). This allows the controller 21 to monitor the battery temperature. Controller 21 may include a microprocessor 23 for controlling the charging and monitoring operations. Controller 21 may control a charging power source for providing power to the battery pack 10, such as current source 22 that provides current to battery pack 10. This current may be a fast charging current and/or an equalization current. Current source 22 may be integrated within controller 21.

Controller 21 may also control a fan 25. Fan 25 preferably blows air towards the battery pack 10 for cooling the battery pack 10.

The charger 200, and its elements within, including controller 21, microprocessor 23, fan 25, and current source 22, receive the necessary power from a power supply 24, which may be connected to a vehicle battery, a generator, or an AC outlet. Power supply 24 may convert the power received from the vehicle battery, the generator, or the AC outlet to the necessary power requirements of the different elements, as is well known in the art.

Persons skilled in the art should recognize that power supply 24 may supply power to other components or elements within charger 200.

In order to prevent charger 200 from consuming energy when the battery pack 10 is not connected to the charger 200, it is preferable to provide a switching means for disconnecting the different elements in charger 200 from the outside power source. In the embodiment of FIG. 2, a switch 26 is disposed between the outside power source and the power supply 24. Switch 26 may be a momentarily-closed single-pole switch that is biased in the open position. As shown in FIG. 2A, the switch 26 has a button that protrudes from the charger housing 27, which encloses the different elements in charger 200. Accordingly, when the battery pack 10 is disposed on the charger 200, switch 26 is closed, allowing power from the outside power source to flow into power supply 24 and ultimately to the different charger elements.

Persons skilled in the art should recognize that, while a certain type of an electromechanical switch has been disclosed, other switches can be used for the same purpose. For example, switch 26 could be a mechanical contact switch, an optical contact switch, an optical proximity switch, a capacitive proximity switch or a magnetic proximity switch.

Figure 3:
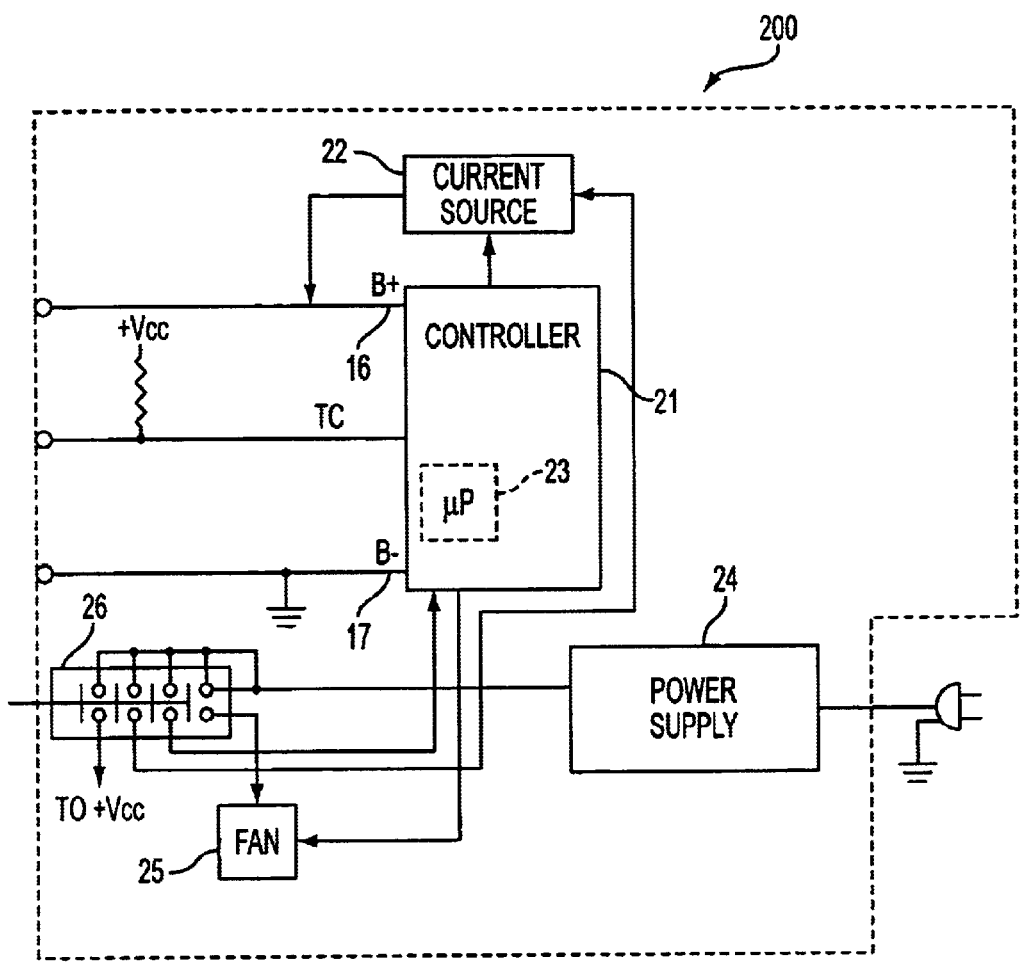
FIG. 3 is a circuit diagram of a charger according to a second embodiment of the present invention.

FIG. 3 illustrates a second embodiment of the invention, where like numbers refer to like parts. The teachings taught in the above embodiment are wholly incorporated herein by reference. The main difference from the first embodiment is that, in the present embodiment, switch 26 can be disposed between the different charger elements, rather than between the outside power source and power supply 24. As shown in FIG. 3, switch 26 may have multiple poles. At least one pole is connected to power supply 24, while the other pole may be connected to controller 21, current source 22, and/or fan 25, etc. Accordingly, when the battery pack 10 is disposed on the charger 200, switch 26 is closed, allowing power from the power supply 24 to flow to the different charger elements.

While FIG. 3 shows all charger elements being disconnected from the power supply 24, persons skilled in the art should recognize that the designer can leave some charger elements connected to the power supply 24 by not disposing switch 26 therebetween.

Figure 4:
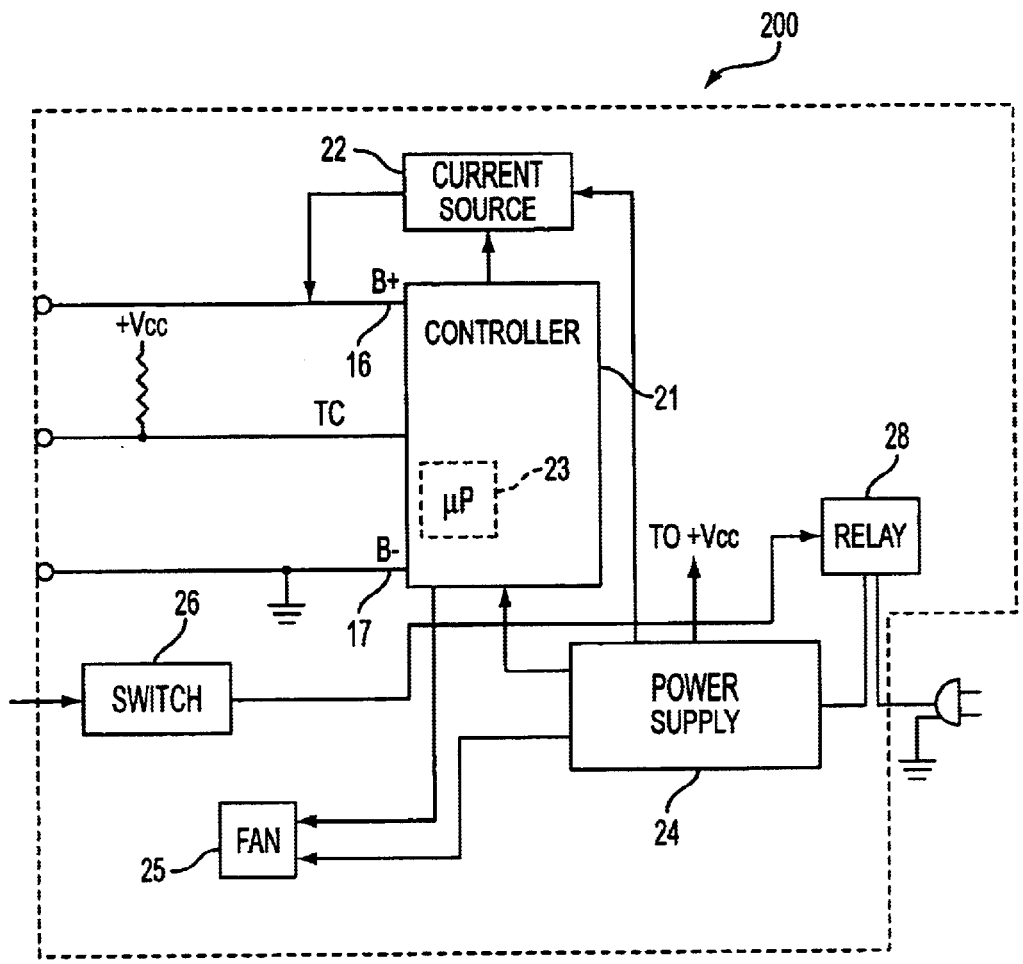
FIG. 4 is a circuit diagram of a charger according to a third embodiment of the present invention.

FIG. 4 illustrates a third embodiment of the invention, where like numbers refer to like parts. The teachings taught in the above embodiment are wholly incorporated herein by reference. The main difference from the first embodiment is that, in the present embodiment, switch 26 is preferably connected to a relay 28, which in turn is disposed between the outside power source and power supply 24. As such, the outside power source and power supply 24 will remain disconnected until switch 26 and relay 28 close. Accordingly, when the battery pack 10 is disposed on the charger 200, switch 26 is closed, relay 28 closes, allowing power from the outside power source to flow into power supply 24 and ultimately to the different charger elements.

Figure 5A:
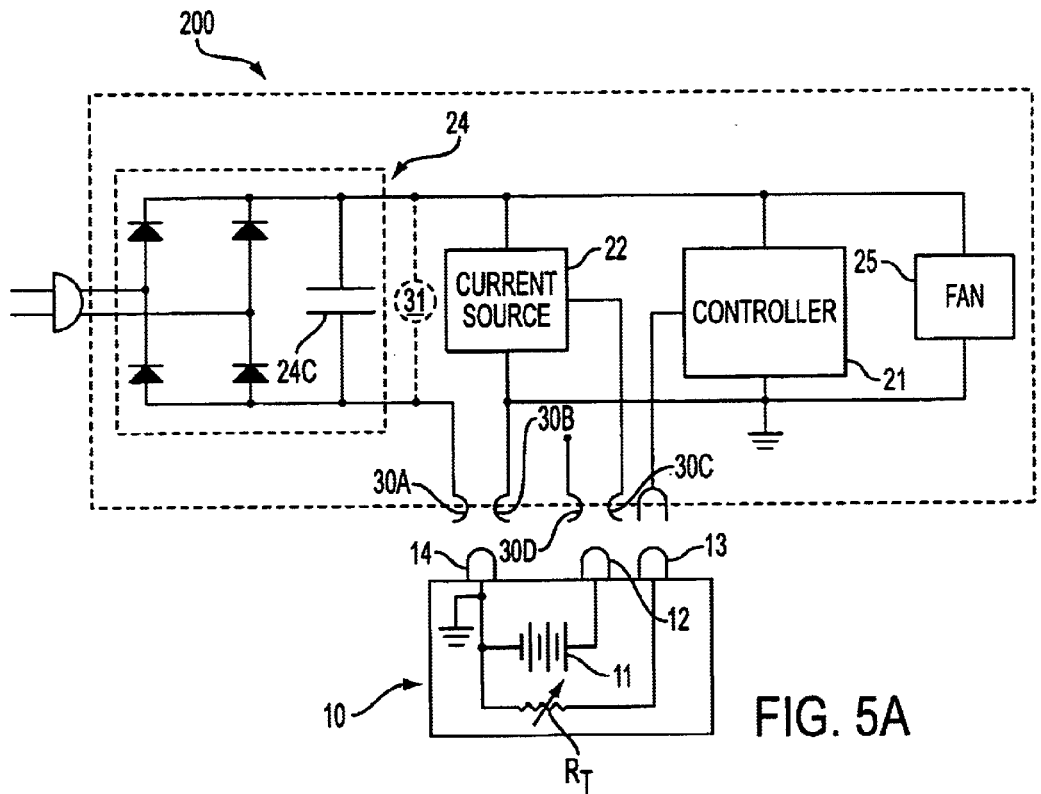
FIGS. 5A and 5B show the battery pack in the removed and installed positions, respectively.
Figure 5B:
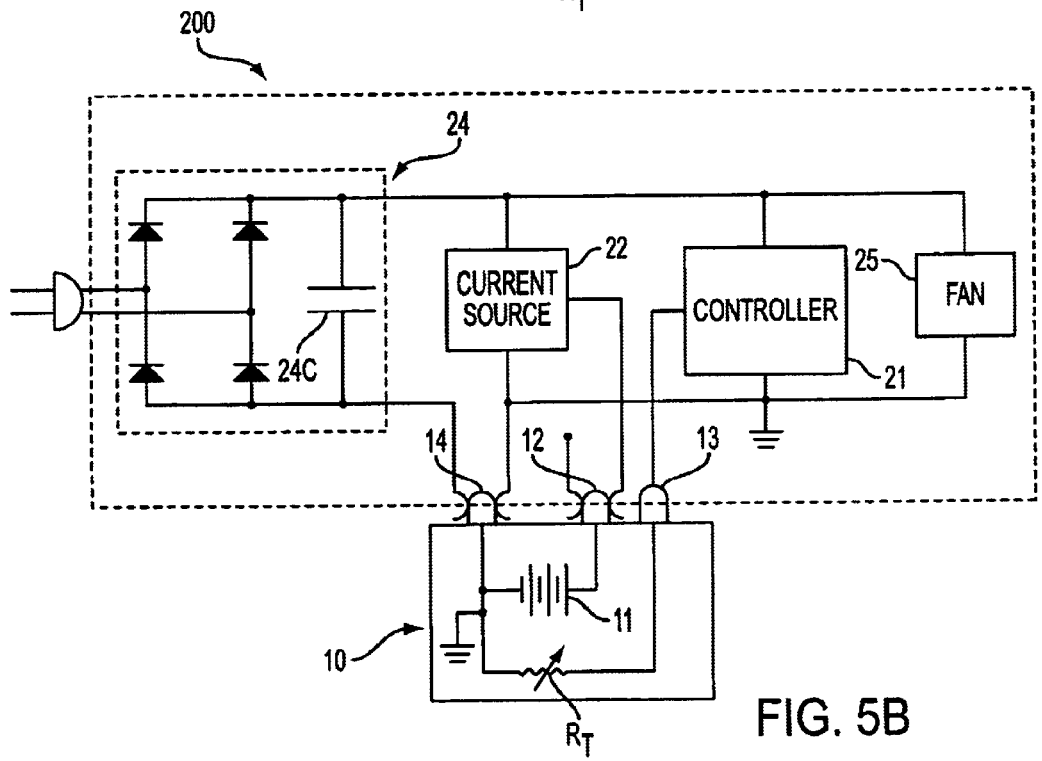

FIG. 5 illustrates a fourth embodiment of the invention, where like numbers refer to like parts. The teachings taught in the above embodiment are wholly incorporated herein by reference. The main difference from the first embodiment is that, in the present embodiment, a discrete separate switch 26 is not used. Instead, one or more of the battery terminals act as the switch.

As shown in FIG. 5, at least one of the charger terminals that contact the battery terminals are preferably split. In particular, the charger terminals 30A, 30B that contact the negative battery terminal 14 are preferably separate, or split, so that upon connecting battery pack 10 to charger 200, the gap between terminals 30A, 30B is closed. When this gap is closed, the power can flow into current source 22, controller 21 and/or fan 25.

Persons skilled in the art will recognize that power still flows through the capacitor 24C. Accordingly, if a designer determines that any components or elements should receive power at all times, rather than just when the battery pack 10 is installed, the designer could dispose those components or elements, such as element 31, in parallel between capacitor 24C and terminal 30A.

It is also preferable to provide split charger terminals 30C, 30D to contact positive battery terminal 12. Upon connecting battery pack 10 to charger 200, power from current source 22 will flow into battery pack 10 via terminal 30C.

Persons skilled in the art will recognize that terminal 30D is a dummy terminal that is preferably not connected to anything. One reason for providing a dummy terminal is that it allows the manufacturer to use more common parts, thus lowering materials costs.

Persons skilled in the art will also recognize that the power supply 24 shown in FIG. 5 constitutes a basic rectifier, but other typical power supply elements, such as transformers or power converter integrated circuits may be added or substituted in power supply 24.

Finally, persons skilled in the art may recognize other additions or alternatives to the means disclosed herein. However, all these additions and/or alterations are considered to be equivalents of the present invention.

What is claimed is:

1. A charger for charging a battery power source removably disposed on and electrically connectable to the charger, the charger comprising:

a controller electrically connectable to the battery power source;

at least one terminal connected to at least one of the controller and the battery power source;

a power supply connectable to an outside power source, the power supply providing power to at least one of the controller and the battery power source; and a switch connected between the outside power source and the power supply, the switch being activated when a battery power source is connected to the at least one terminal.

2. The charger of claim 1, further comprising a fan connected to the power supply.

3. The charger of claim 2, wherein the fan is controlled by the controller.

4. The charger of claim 1, further comprising a current source connected to the power supply.

5. The charger of claim 4, wherein the current source is controlled by the controller.

6. A charger for charging a battery power source removably disposed on and electrically connectable to the charger, the charger comprising:
   a controller electrically connectable to the battery power source;
   at least one terminal connected to at least one of the controller and the battery power source;
   a power supply connectable to an outside power source, the power supply providing power to at least one of the controller and the battery power source; and
   a switch connected between the outside power source and the power supply, the switch being activated when a battery power source is disposed on the charger.

7. The charger of claim 6, further comprising a fan connected to the power supply.

8. The charger of claim 7, wherein the fan is controlled by the controller.

9. The charger of claim 6, further comprising a current source connected to the power supply.

10. The charger of claim 9, wherein the current source is controlled by the controller.

11. A charger for charging a battery power source removably disposed on and electrically connectable to the charger, the charger comprising:
    a controller electrically connectable to the battery power source;
    at least one terminal connected to at least one of the controller and the battery power source;
    a power supply connectable to an outside power source, the power supply providing power to at least one of the controller and the battery power source; and
    a switch connected between the power supply and at least one of the controller and the battery power source, the switch being activated when a battery pack is connected to the at least one terminal.

12. The charger of claim 11, further comprising a fan connected to the power supply.

13. The charger of claim 12, wherein the fan is controlled by the controller.

14. The charger of claim 11, further comprising a current source connected to the power supply.

15. The charger of claim 14, wherein the current source is controlled by the controller.

16. A charger for charging a battery power source removably disposed on and electrically connectable to the charger, the charger comprising:
    a controller electrically connectable to the battery power source;
    at least one terminal connected to at least one of the controller and the battery power source;
    a power supply connectable to an outside power source, the power supply providing power to the controller and the battery power source, wherein the power supply will not supply power to the controller unless the battery power source is connected to the power supply.

17. The charger of claim 16, further comprising a fan connected to the power supply.

18. The charger of claim 16, further comprising a current source connected to the power supply.

19. The charger of claim 18, wherein the power supply will not supply power to the current source unless the battery power source is connected to the power supply.

* * * * *